Sept. 1, 1953        I. A. WEAVER        2,650,961
PICKUP DEVICE FOR USE WITH BALANCE TESTING MACHINES
Filed July 26, 1949        10 Sheets-Sheet 1
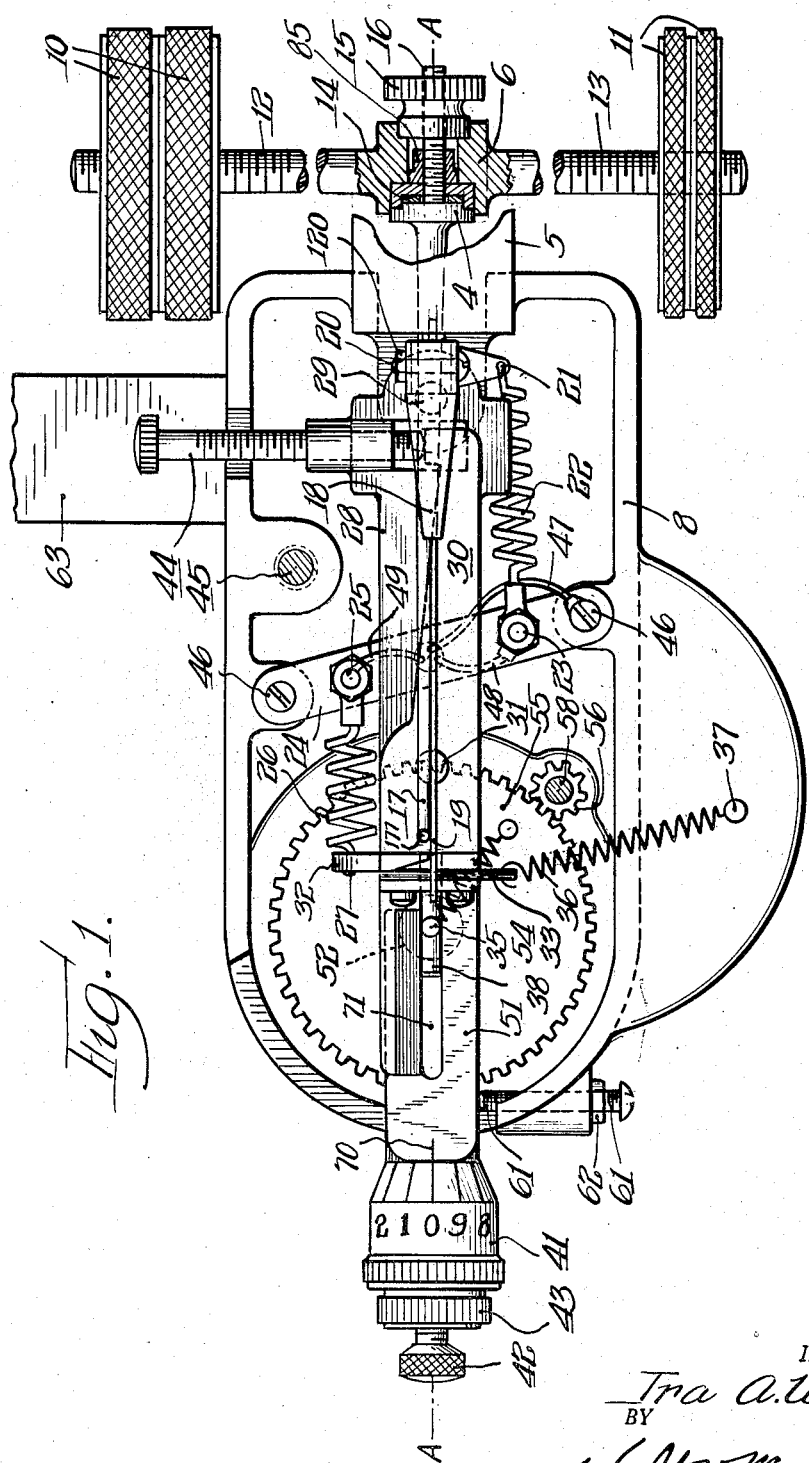
INVENTOR.
*Ira A. Weaver*
BY
*Walter M. Fuller*
Atty.

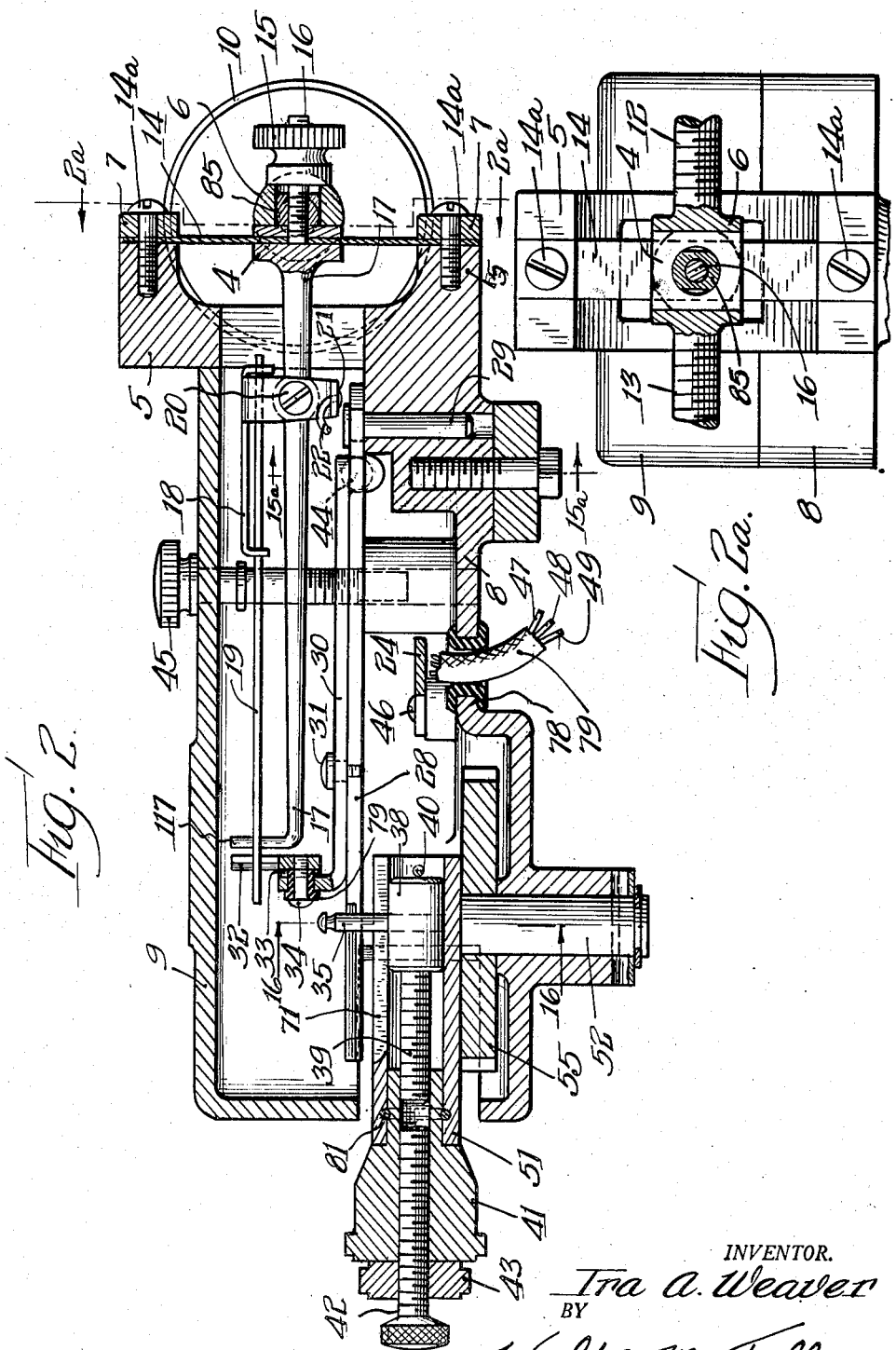

Sept. 1, 1953            I. A. WEAVER            2,650,961
PICKUP DEVICE FOR USE WITH BALANCE TESTING MACHINES
Filed July 26, 1949            10 Sheets-Sheet 3
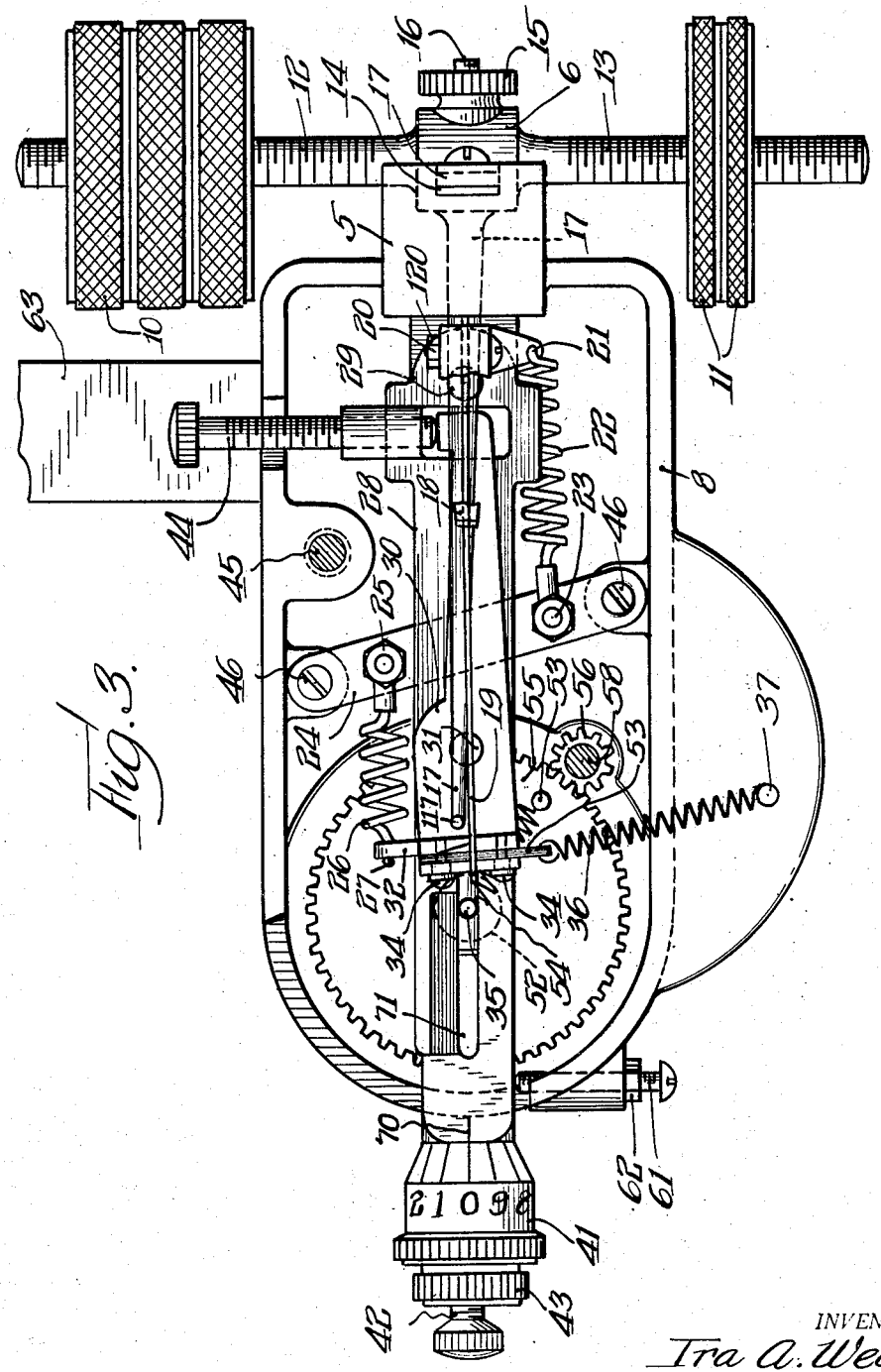

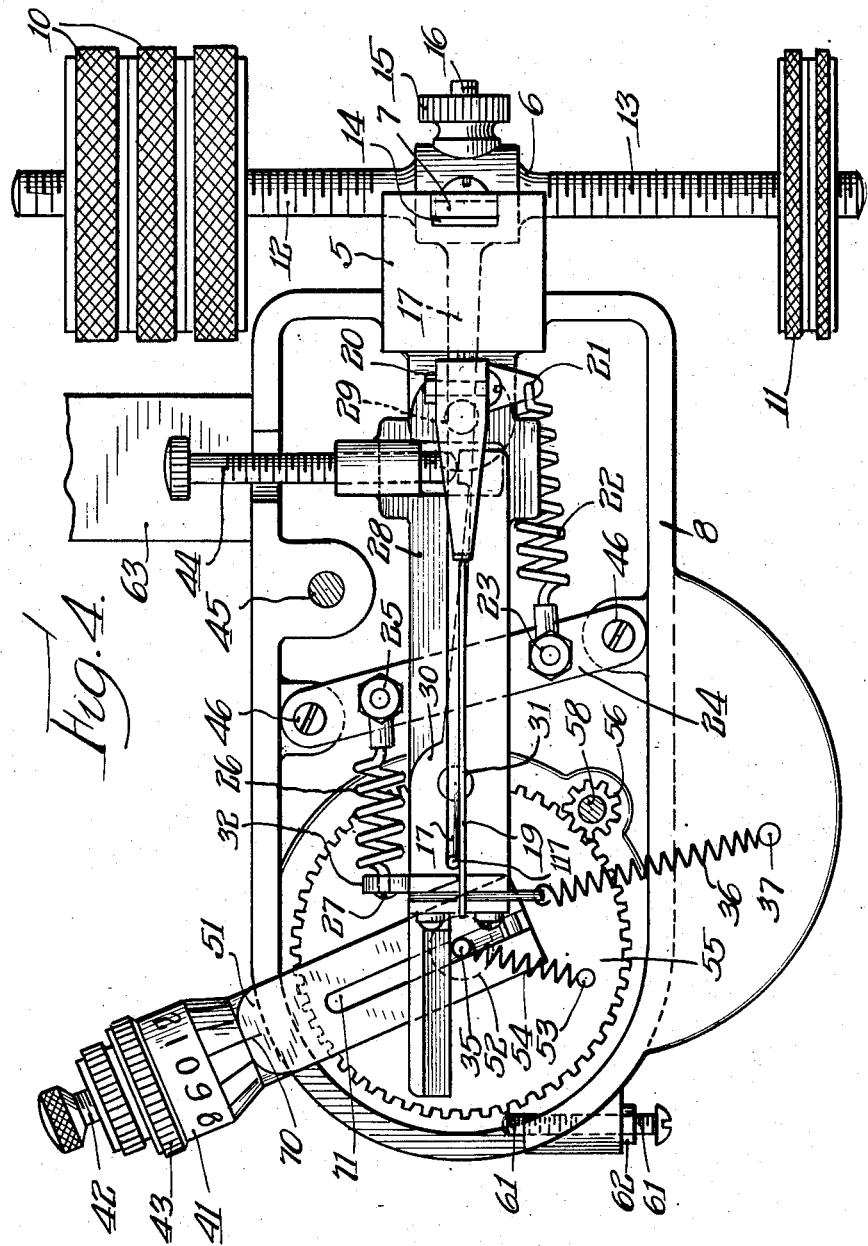

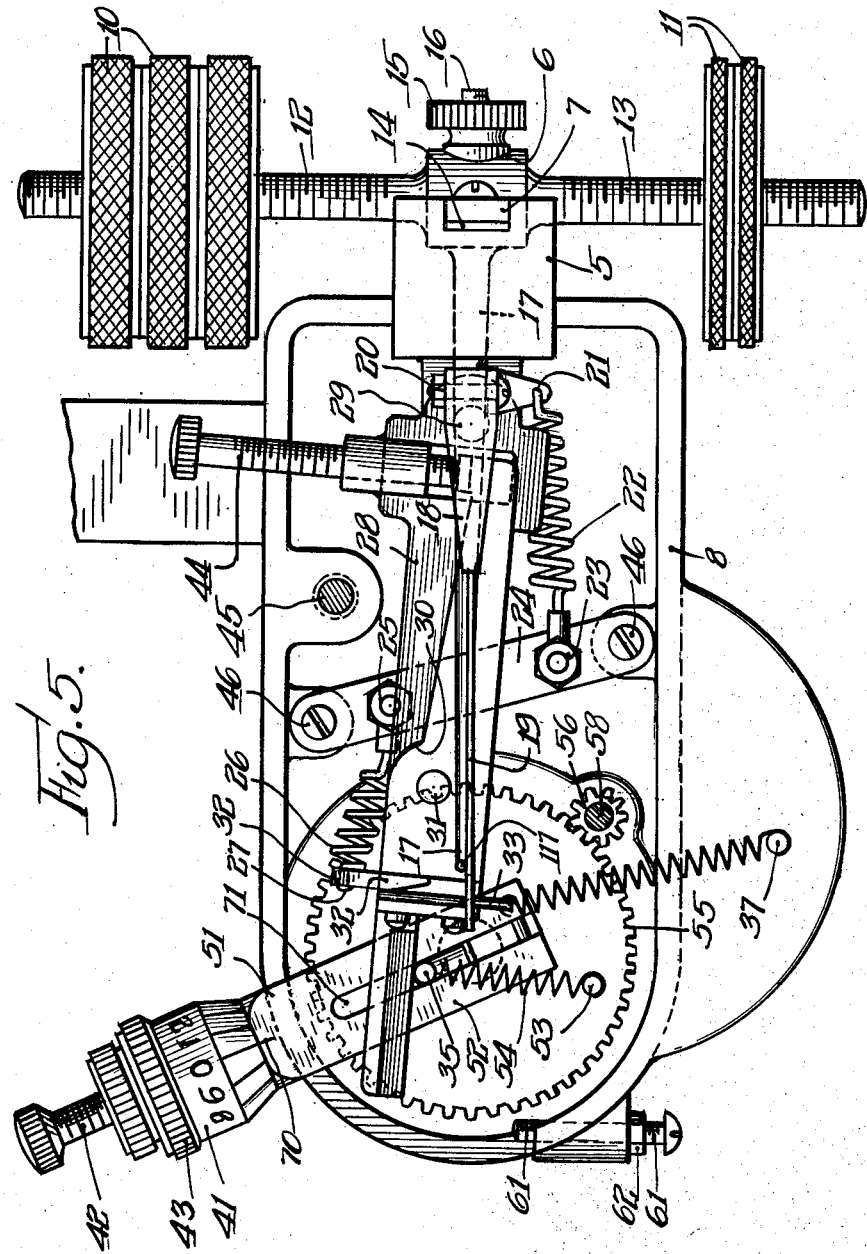

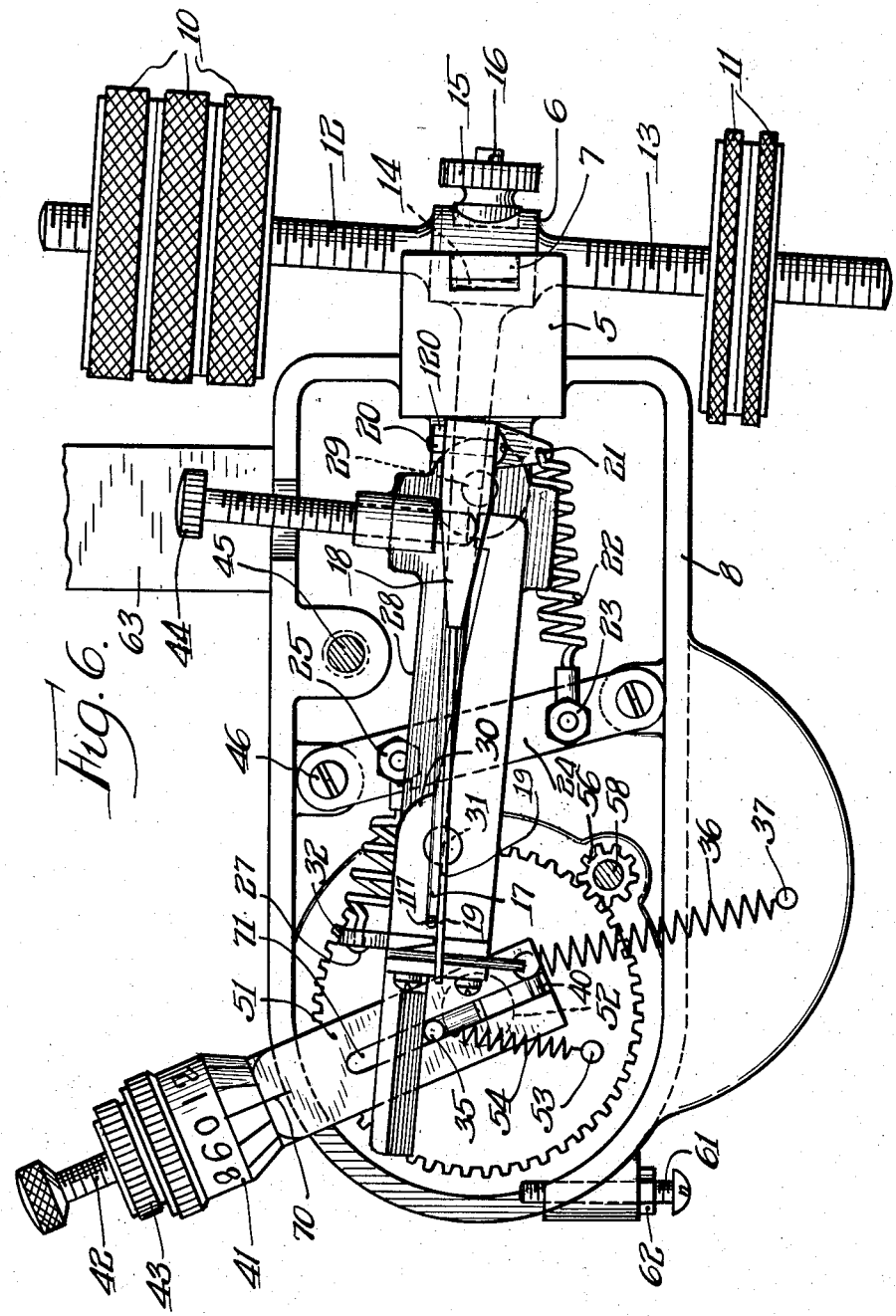

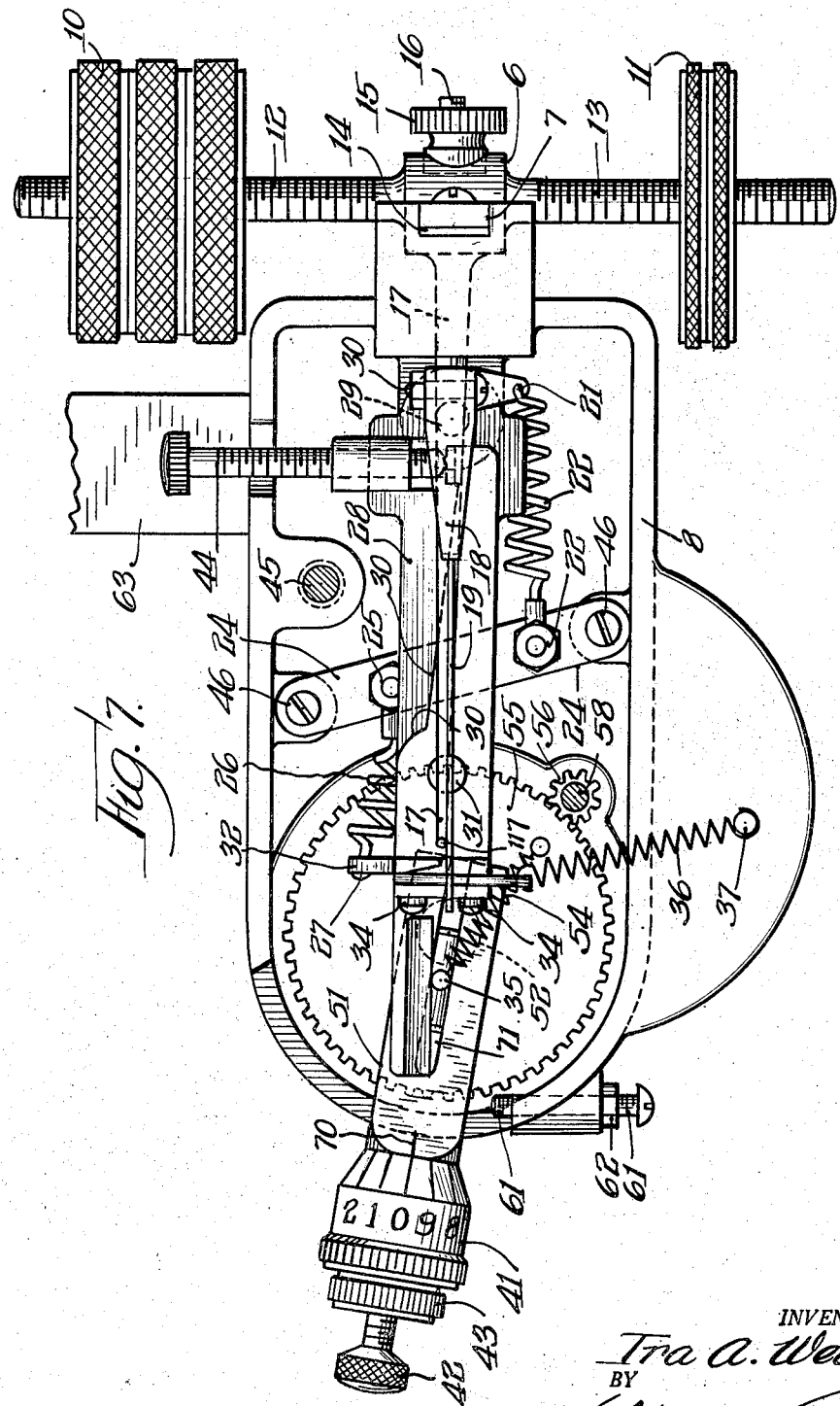

Sept. 1, 1953            I. A. WEAVER            2,650,961

PICKUP DEVICE FOR USE WITH BALANCE TESTING MACHINES

Filed July 26, 1949            10 Sheets-Sheet 8

INVENTOR.
Ira A. Weaver
BY
Walter M. Fuller
atty

Sept. 1, 1953            I. A. WEAVER            2,650,961
PICKUP DEVICE FOR USE WITH BALANCE TESTING MACHINES
Filed July 26, 1949            10 Sheets-Sheet 9
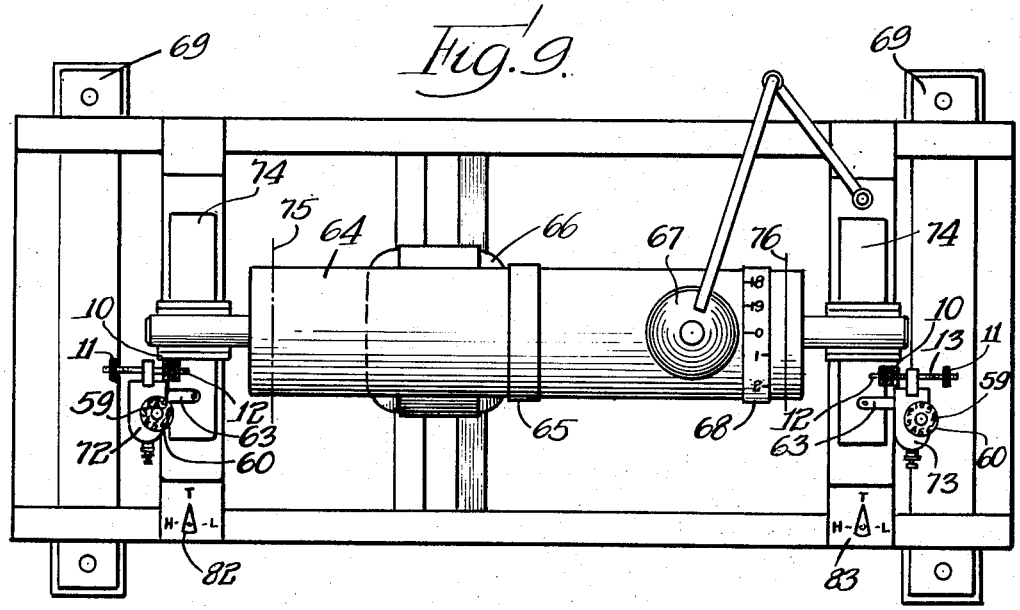
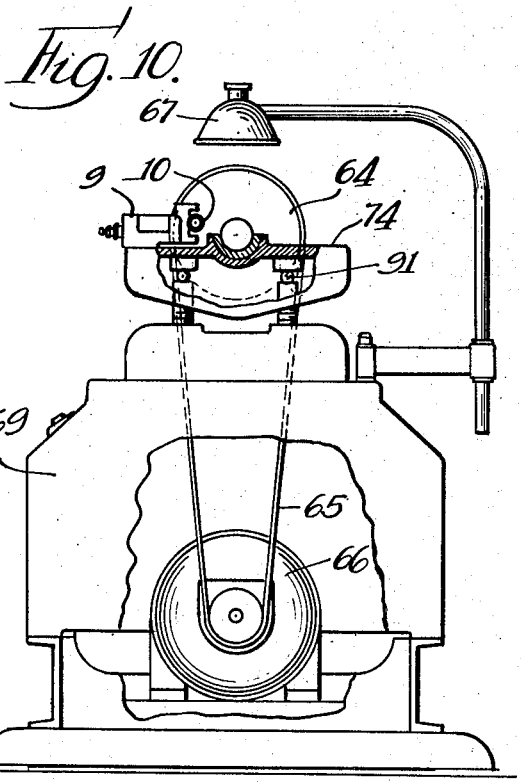
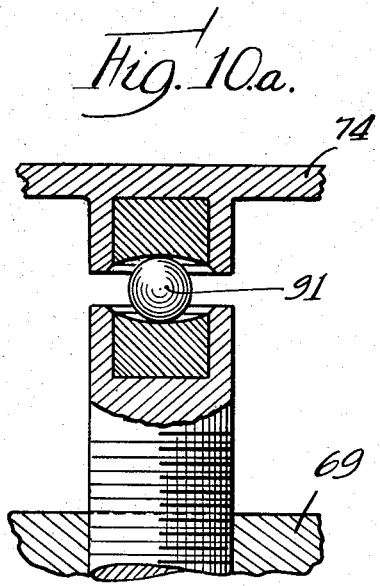
INVENTOR.
Ira A. Weaver
BY Walter M. Fuller, atty.

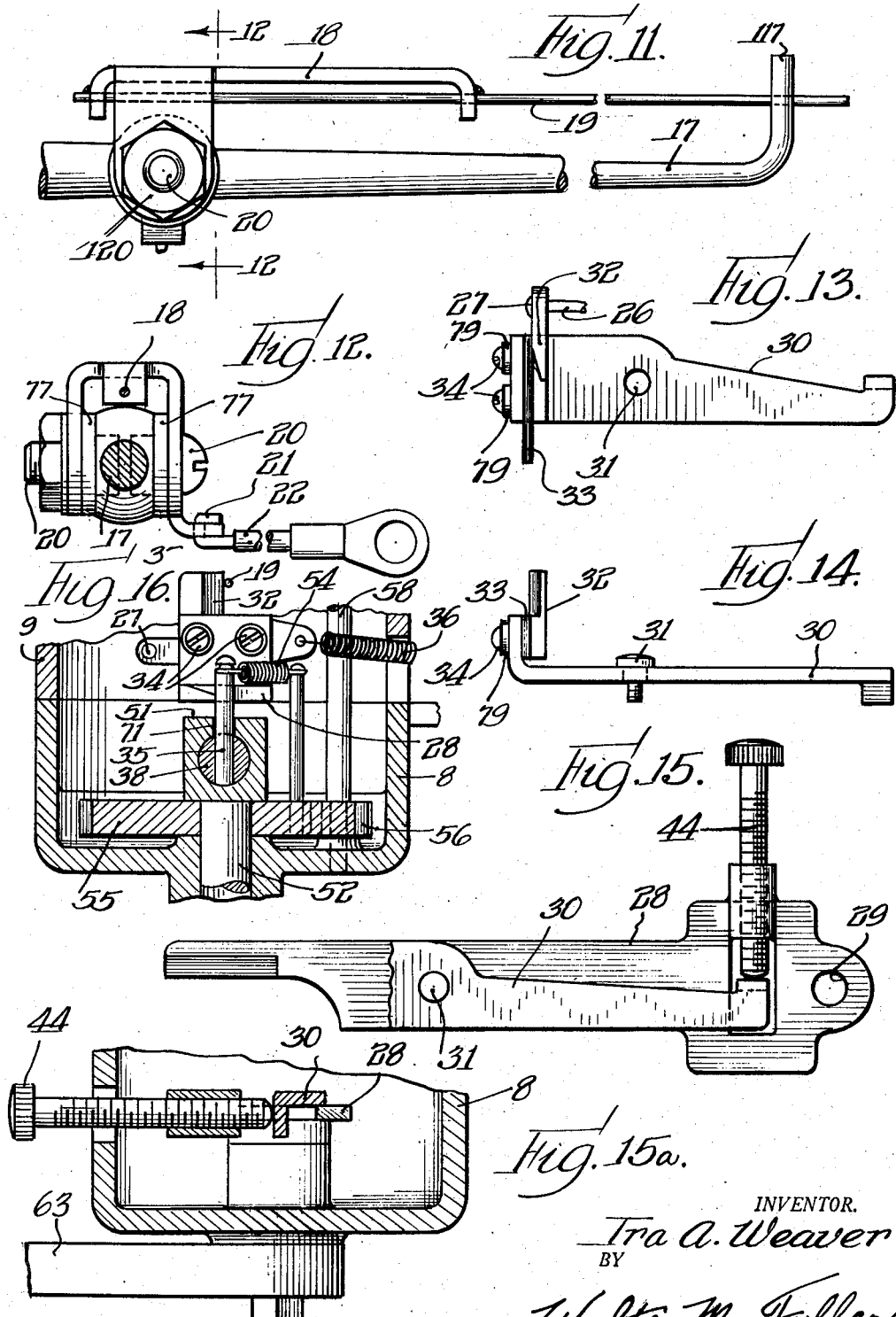

Patented Sept. 1, 1953

2,650,961

UNITED STATES PATENT OFFICE 2,650,961

PICKUP DEVICE FOR USE WITH BALANCE TESTING MACHINES

Ira A. Weaver, Springfield, Ill., assignor, by mesne assignments, to Gisholt Machine Company, Madison, Wis., a corporation of Wisconsin Application July 26, 1949, Serial No. 106,912

12 Claims. (Cl. 200—23)

1

This invention relates to pick-up devices for use with balance testing machines of the general type described in United States Letters Patent No. 2,487,035 granted to the present applicant jointly with Clyde H. Phelps on November 1, 1949, on an application co-pending herewith.

One important difference between the present invention and prior ones in this same general field is in the method of operating a stroboscope light and the determination of the amplitude of oscillation of the inertia-weight means employed in the mechanism about the mounting pivot, said amplitude of oscillation being a direct proportional indication of the amount of unbalance existing in a chosen correction-plane of the rotating work-piece or rotor undergoing test in the associated balance-testing machine.

It will be understood that the term "correction-plane" is a plane through the rotating work-piece or rotor undergoing investigation in the testing machine perpendicular to the axis of such rotor, such correction-plane being anywhere along the axis of the work-piece between the limits of the physical dimensions of such element. If a single correction-plane only is employed it might be near the end thereof, or there may be two or more correction-planes used; the location of such plane or planes being determined by the physical make-up of the workpiece undergoing test. For instance, in the rotor of an electric motor two such correction-planes might be chosen, one near each end of the main body of the rotor; but on a crank-shaft, for instance, one might be located on each of the so-called "cheeks" of the crank-shaft or near the connecting-rod bearings.

In the present invention one object is to provide a set of adjustable circuit breaker points to operate the stroboscope light, which is an intermittently flashing light illuminating periodically and cyclically the number-band encircling the workpiece and rotating with it, such flashes of light being of such duration that any number illuminated at any given time appears to be stationary, such breaker points being operated by the pivoting of one or more inertia-weights about their pivot point.

The frequency of oscillation is greater than the normal resonant or natural frequency of oscillation of the inertia-weight means. If the workpiece rotates 1800 R. P. M. the inertia-weight means oscillate 1800 cycles per minute, and, therefore, the light flashes in synchronism with the oscillation of the weight-means and the corresponding identical revolutions of the rotating work-piece undergoing test.

2

Another purpose of the invention is to provide a simple mechanical means for obtaining the degree of amplitude of oscillation of the inertia-weight means by calibrated adjustment of such breaker points, as set forth hereinafter.

In order that a full and complete understanding of this invention may be had, and the attainment of the stated and other objects of the invention, a preferred and desirable embodiment of the invention has been illustrated in the present drawings forming a part of this specification, and in which:

Figure 1 is a plan view of the novel pick-up device with its cover removed;

Figure 2 is a vertical, longitudinal section of the device on the center line A—A of Figure 1 except that the cover is included in such section, some elements of the structure being included in full elevation and said levers and attaching means for the inertia-weight means not being shown in section, but in full lines;

Figure 2a is a sectional view taken on the line 2a—2a of Figure 2;

Figures 3 to 7 inclusive are plan views, the same as Figure 1, except that the various adjustments of the device are indicated in different aspects and degrees of their adjustments;

Figure 3 presents the centering-screw 44 backed off or receded from its normal central adjustment so that the arm 17 does not touch the reed 19;

Figure 4 illustrates the ratio-block 51 and associated parts as rotated clockwise through a given angle;

In Figure 5 the ratio-nut 41 has been indicated as turned clockwise causing the ratio-pin 35 which is on center in Figure 4 to be moved upward away from its normal central position depicted in Figure 4, bringing with it the ratio-bar 28;

In Figure 6 the inertia-weights and the associated bar 17 are shown as having turned clockwise about the pivot-spring 14 by a fixed amount;

Figure 7 pictures the ratio-block 51 as shown rotated clockwise by a smaller amount than in Figures 4, 5 and 6;

Figure 8 is a top view of the complete pick-up device including the cover in place thereon;

Figure 9 is a plan view of a complete balance-testing machine including the work-piece to be tested in place thereon and showing two of the new pick-up devices of the form indicated in the preceding figures mounted rigidly in their proper positions with one on each of the bearing members of the machine with the aligned screw-threaded inertia-weight supporting means in parallelism with the axis of the work-piece or rotor;

Figure 10 is a view of the right-hand end of the testing-machine shown in Figure 9 with a portion of the end bearing support cut away to show the driving motor and its associated motor-driven belt which revolves the work-piece on its horizontal longitudinal axis;

Figure 10a is an enlarged detailed sectional view showing one end of the bearing member suspension in large detail as it appears in Figure 10;

Figures 11 and 12 are side and end views respectively of contact-arm 17, reed-bracket 18, and reed 19 soldered to its bracket 18, drawn to a larger scale the better to show the construction;

Figure 13 is a segregated top view of the centering-lever 30 and associated parts, the element 33 being an insulating plate which extends beyond the other parts of that structure so that a hook can be connected therewith;

Figure 14 is a side view of the same;

Figure 15 is a detail view of the ratio-bar 28 and a portion of the centering-lever 30 pivotally attached thereto and the screw 44 for adjusting the centering-lever 30;

Figure 15a is a sectional view taken on the line 15a—15a of Figure 2;

Figure 16 is a cross-sectional view taken on the line 16—16 of Figure 2; and

Figure 17 is a schematic diagram which depicts the manual switching arrangement.

In Figures 1 and 2, the reference numeral 8 designates the main body of the new pick-up device in which most of the working parts of such mechanism are mounted, and 9 is the demountable cover in place in Figure 2.

The centrally screw-threaded, externally knurled, inertia-weights 10 and 11 are adjustably mounted on the opposite, screw-threaded, aligned, end rod portions 12 and 13, both of which in turn are integral parts of their associated intermediate hub 6.

A thin, flat spring 14 is securely mounted on the extended portions 5, 5, of the body 8 by means of clamping blocks 7, 7, and associated screws 14a.

In Figure 2 it will be observed that the spring 14 is secured only at its two ends and that the central portion of its length is in open space between the separated upper and lower element 5, 5. To this exposed, central part of the flat spring 14 is attached an arm 17 (Figures 1 to 7). The threaded end portion 16 of arm 17 extends continuously from the point 16 through a hole in the center of the spring 14 and is securely clamped thereto by a nut 85, this arm 17 being continuous from such nut to its upturned end 117, as shown clearly in Figure 2.

The central portion of the hub 6 of the inertia-weight mounting toward the main part of the device is recessed or slotted vertically to fit over the flattened sides of the hub 4 of the arm 17 to hold it in a horizontal position, or it could obviously be fastened in any other equivalent manner, if preferred, and holds the axis in proper alignment and the spring itself holds it in correct longitudinal alignment. The entire inertia-weight assembly is securely clamped to the outer threaded end portion 16 of the arm 17 by the nut 15, as shown in Figures 1, 2, 3, 4, 5, 6, 7 and 8. Thus the inertia-weight assembly and the arm 17 are a unitary assembly which is securely clamped to the spring 14 at the center of the latter, it thus being now evident that the inertia-weight assembly and the arm 17 can oscillate as a unit horizontally about the spring 14 as a pivot by twisting said spring since the latter is acting as a vertical torsion spring having both ends securely clamped and its center free to twist horizontally when a twisting force is applied to it by the oscillation of the inertia-weight means about the spring 14, as its pivot. When no twisting force is applied to the spring its inherent stiffness causes it to rest in its normal, neutral, flat, vertical plane whereby the unitary inertia-weight assembly and arm 17 are normally at rest in the same zero or central position when no twisting force is applied due to the inherent reflex action of the spring 14.

It should be apparent that the unitary assembly of inertia-weights 10 and 11 and arm 17 may oscillate readily about the center of the spring 14 as a pivot and, furthermore, that said unitary assembly may pivot equally clockwise and counter-clockwise from its normal central "at rest" position.

Naturally, the greater the oscillatory force applied to the inertia-weight means the greater the amplitude of oscillation of said assembly will be.

Attached to such arm 17, Figures 1, 2 and 11, is a reed-bracket 18, the latter and its associated reed 19 being made of electrically conductive material. Attachment of this reed-bracket 18 is made to arm 17 by means of a screw 20 and its associated nut 120, this being shown more clearly in Figures 11 and 12. The screw may be tightened so securely that the reed-bracket 18 cannot pivot about said screw. It is to be also noted that the reed-bracket 18 and the reed 19 are electrically insulated from the arm 17 by the insulating bushings 77 in Figure 12. At the point 21, Figure 12, is attached an electrically conducting wire 22 for attachment to the electrical circuit as well be described later. The reed 19 being made of a thin, flexible wire normally resting against the upwardly turned end 117 of arm 17 with a slight tension, which tension may be adjusted by loosening the screw 20 and pivoting the bracket 18 and reed 19 upward so that the end of the reed 19 is just above the upwardly turned end 117 of arm 17. This reed is then bent toward the arm 17 until it will normally rest slightly beyond the upturned end 117 of the arm 17 or toward the observer in Figure 11. Then by flexing the reed 19 away from the observer and pivoting the bracket 18 and reed 19 downwardly and securely tightening the screw 20 the reed is now held in normal position, as shown in Figure 11, and rests with a slight initial tension against the upwardly turned end 117 of the arm 17.

It is now readily apparent that the assembly of arm 17, and reed 19, when properly connected in an electric circuit may act as a normally closed switch, and when the reed 19 is flexed away from the arm 17 the circuit will be broken. The reed 19 being of very thin material, and its area of contact with the arm 17 being very small, only very feeble electric currents may be carried. However, the grid current required to trigger a thyratron or equivalent electronic tube to operate a stroboscope light is exceedingly small. The stroboscope light flashes at the moment of contact of the reed 19 with either contact-plate 32 or arm 17.

In Figures 1 to 7 inclusive is shown mounted at points 46, 46, on the bottom wall of body 8 of the pick-up device an insulating strip 24, and in Figure 12 there is shown the conducting wire 22 attached to the bracket 18 and ending in a connecting terminal 23.

In Figures 1, 3 to 7 inclusive, and Figure 12 is shown this wire 22 attached to the bracket 18 at the point 21 with the opposite end terminal connected to point 23 on the insulating strip 24.

The wire 48, Figures 1 and 2, is connected to the point 23 on the underside of the insulating strip 24, see Figure 1. The wires 47, 48 and 49 are shown in Figure 2 coming out through a rubber grommet 78 in the bottom of the body 8. Each of the wires 47, 48 and 49 are covered with insulating material and are all three enclosed in a common insulating sheath 79, Figure 2.

The wire 48 which we have discussed above goes to one side of the grid circuit of the thyratron which operates the stroboscope light.

In Figures 1 to 7 inclusive and in an isolated detailed view in Figure 13, to help clarify the construction, is shown a centering-lever 30 on which, by means of screws 34, but electrically insulated from it by insulating strip 33 and insulating bushings 79 over the screws 34, is a contact-plate 32 to which is suitably soldered at 27 an insulated electrical conducting wire 26. On the opposite end of this wire 26 is a terminal which is attached to the insulating strip 24, heretofore mentioned, by the screw and associated nut 25 (Figure 1). Suitably attached to the underside of screw 25 is the wire 49 (Figure 1) which leads to the outside in the common sheath 79 through the grommet 78 in the bottom of case 8 (Figure 2) for suitable connection to the grid circuit of the thyratron heretofore discussed.

The third wire 47 is grounded to the case 8 at any convenient place, here shown under the head of one of the screws 46 which fasten the insulating strip 24 to the case 8, Figure 1.

Referring now to Figures 1 to 7 inclusive and Figure 15, the ratio-bar 28 which is pivotally mounted on the top end of a vertical pivot-pin 29 in case 8, as illustrated most clearly in Figures 1 and 2, Figure 15 indicating a segregated top view of such ratio-bar 28. Pivotally mounted by means of a vertical pivot 31 on the ratio-bar 28 is the centering-lever 30, shown in Figure 15, with a portion of the left end cut away.

Also shown clearly in Figure 15 is an adjusting screw 44 threaded through an elongated boss on the side of the ratio-bar 28. The end of the adjusting screw 44 bears against one side of the centering-lever 30 near its right-hand end, Figures 1, 3 to 7 inclusive, and Figure 15, these parts also being shown in various phases of adjustment in Figures 3 to 7 inclusive.

In Figure 13, a contact-plate 32 is shown mounted on the upturned end of centering-lever 30, such contact-plate 32 being electrically insulated from the centering-lever 30 by the insulating plate 33 and suitable bushings 79, the insulating plate 33 being longer than the width of the centering-lever 30 so that one end extends out in such a way that the spring 36 may be hooked over the pin 37 in case 8; this spring 36, Figure 1, being under tension causing the centering-lever 30 to pivot counter-clockwise in the several top views of these drawings about the pivot 31, thus causing the side of the opposite end of centering-lever 30 to rest against the end of the adjustable centering-screw 44. When the end of the centering-lever 30 is against the end of the screw 44 the assembly of centering-lever 30 and ratio-bar 28 become a rigid unit pivoting about the pin 29. The tension of the spring 36 thus pulls the ratio-bar 28 until it rests against the pin 35 (Figures 1 to 7 inclusive).

Referring now to Figure 2, the ratio-pin 35 in its zero position above the center of the bottom gear 55 is secured in the cylindrical ratio-slide 38 which also has a longitudinal screw-threaded portion 39 extending from one end of the cylindrical ratio-slide 38, the latter being mounted so as to slide endwise in a cylindrical hole in the ratio-block 51 with the ratio-pin 35 protruding upward through an endwise slot 71 in the ratio-block 51. This ratio-block 51 is pivotally mounted in the case 8 by the downwardly extending pin 52 which is rigidly attached to the block 51.

The spur-gear 55 is so mounted that it cannot turn with reference to the block 51 and is also rigidly mounted on the pin 52 whereby the gear 55 and ratio-block 51 rotate a limited amount as a unit due to their rigid association with one another. The pin 52 and ratio-block 51 are rigidly secured together, and are preferably integral.

This spur-gear 55 may be rotated by means of its intermeshing pinion 56 which is attached to the pinion-shaft 58, such shaft extending upwardly through the cover 9 and terminating in a knob 57 to which is attached a pointer 59 (Figure 8), such pointer 59 operating over a coacting stationary scale 60 mounted on the top of cover 9.

Referring again to Figure 2, it will be observed that the cylindrical ratio-slide 38 and its integrally-threaded portion 39, together with the integrally-mounted upwardly extending ratio-pin 35 may be moved endwise in the ratio-block 51 by manual turning of the ratio-nut 41, such nut being threaded onto the threaded extending portion 39 of the ratio-slide 38. A portion of the ratio-nut 41 is externally knurled for easy manual turning by the fingers and a smaller diameter portion is beveled and uniformly graduated in ten parts, as shown, its numerals being displayed on its adjacent cylindrical portion.

A retainer spring 81, Figure 2, is slipped over the small diameter cylindrical portion of the ratio-nut 41, which portion of the nut extends into the cylindrical space which extends endwise through the ratio-block 51 for its entire length. An annular groove is cut near the outer end of this space in the block 51 so that the spring retainer engages an internal annular slot in the space and an external annular slot in the small diameter portion of the ratio-nut 41 simultaneously in alignment, thus preventing the nut 41 from being moved endwise but capable of rotation for the purpose of moving the ratio-slide 38 longitudinally in the above-mentioned space.

A line designated 70, Figure 6, is marked on the exterior of the ratio-block 51 so as to coact with the graduated scale on the ratio-nut 41. In Figure 2 it is to be borne in mind that when the ratio-nut 41 is turned counter-clockwise when facing the left end, being a right-hand thread, the threaded portion 39 recedes from the nut 41. Consequently, the ratio-slide 38 is advanced to the right until it rests against the stop pin 49. When this occurs the ratio-pin 35 is concentric with the shaft 52 which is the center of rotation of spur-gear 55 and the ratio-block 51. In this position, then, rotation of the ratio-block 51 and its associated ratio-pin 35 will not cause any movement of the ratio-bar 28. See Figure 4 where the ratio-block 51 is rotated clockwise to its full limit of movement in that direction, but the ratio-pin 35 has caused no movement of the ratio-bar 28 about its pivot 29.

Refer again to Figure 1, and note that the side of the ratio-block 51 bears against the end of the screw 61 and that this screw is so adjusted that when the ratio-block 51 is rotated counter-clockwise until it is stopped by the screw 61 the center line of the slot 71 in the ratio-block 51 is parallel with and in the same vertical plane as center line A—A.

Referring to Figure 8, note that the manual turning of knob 57 and its integral shaft 58 turns the pinion gear 56, and by turning of this knob 57 counter-clockwise one full turn from its zero position, the ratio-block 51 is rotated clockwise to its full limit, as shown in Figures 4, 5 and 6 due to the interaction of the pinion 56 and the spur-gear 55. Such one full manual turn of the pinion 56 is indicated by the pointer 59 and its associated scale 60 having turned from its zero indication completely around 360° to the same zero. If such knob 57 is turned a fraction of the complete rotation such fraction will, of course, be indicated on the scale 60 by the pointer 59 and the ratio-block 51 will have been turned a corresponding fraction of its complete movement, as shown in Figure 7.

Figure 7 shows the ratio-block 51 as rotated a fraction of a turn only from its straight-away or normal zero position, and, in this particular instance, the pointer 59, Figure 8, would stand at the figure 1 of the scale 60. The point 1 on such scale 60 is so located that when the pointer 59 registers with such point on the scale the ratio-pin 35 will move the ratio-bar 28 one-tenth as much angularly as when the pointer 59 is rotated one full turn. Point 2 on scale 60 is so located that when the pointer 59 is in register with such 2 on the scale the ratio-pin 35 will move the ratio-bar 28 two-tenths as much as a full turn of the pointer 59, and so on.

Referring again to Figure 5, it should be noted that the position of the contacting-plate 32 which, as previously explained, is securely mounted to the upturned end of the centering-lever 30 but electrically insulated therefrom, and it should also be remembered that the centering-lever 30, being mounted as previously described, on the ratio-bar 28 moves pivotally with it. In Figure 5, then, the contact-plate 32 has moved away from the reed 19 which rests, due to its initial tension, against the upturned end of arm 17.

Referring now to Figure 6, wherein the inertia-weights 10 and 11 have been rotated clockwise a small amount about their pivot spring 14 it is to be observed that the arm 17 has moved also about the pivotal spring 14 to a point where its upturned end is slightly beyond the contact-plate 32 thereby allowing the reed 19 to rest against the contact-plate 32. It is readily evident that as the arm 17 and the very light reed 19 move toward the contact-plate 32 a point in this movement was reached where the reed 19 contacts the contact-plate 32. The electrical circuit is so arranged that the stroboscope light will flash at the instant of such contact. The upturned end 117 of arm 17 will continue its motion in the same direction breaking contact with the reed 19 until the inertia-weights 10 and 11 have reached the limit of movement and start back. When they start back toward their normal central position, the upturned end 117 of the arm 17 comes in contact with the reed 19 and at the instant of such contact the electrical circuit is so arranged that the stroboscope light again flashes. It should be apparent that the reed 19 is brought into contact alternately with the arm 17 and the contact-plate 32 once during each complete cycle of oscillation of the inertia-weights 10 and 11 about their pivot spring 14.

With the inertia-weights 10 and 11 in oscillatory motion of constant amplitude about the pivot spring 14 the ratio-nut 41 may be turned in such direction as to move the ratio-pin 35 farther from its central position. If such motion be continued a point will be reached in which the reed 19 will not touch the contact-plate 32 and the stroboscope light will cease flashing.

The operator by turning the ratio-nut 41 a small amount in alternate directions can ascertain the point at which the stroboscope light just ceases to flash and then by noting the number of turns of the ratio-nut 41, and the fractions of the turn, on the peripheral scale on the ratio-nut 41 he knows with precision the amount the ratio-pin 35 has been moved and it is evident that such a movement is a direct measure of the amplitude of oscillation of the inertia-weights 10 and 11 about their pivot spring 14. Should such amplitude be a very small amount, the ratio-block 51 may be moved a fraction of its full amount as might be indicated by the pointer 59 being turned to numeral 1 on scale 60. Then the ratio-nut 41 will have to be turned ten times as many turns to move the ratio-bar 28 a given amount as in the case above described. Thus, it is evident that the amplitude of oscillation of the inertia-weights 10 and 11 about their pivot spring 14 may be measured with great precision.

In Figure 17, two of the new pick-up devices are shown, designated as a whole 72 and 73 respectively, corresponding to the designations used in Figure 9. The switches for each end are shown schematically, 82 representing the switch for the left-hand end whereby the circuits for the various phases of operation of the pick-up device 72 are controlled. In like manner, 83 controls the various aspects of the electrical operation of the pick-up device 73 on the right-hand end. The position of the switch as illustrated in Figure 17 is marked "Test" for the central position and is the position of the switch which will cause diametrically opposite numbers on the number-band 68, see Figure 9, to be illuminated as the work-piece 64 rotates. For instance, numbers 1 and 11, 2 and 12, etc.

In turning the switch 82 on the left-hand end to the position "Heavy" the number will be illuminated on the number-band 68 to show which is the heavy side of the work-piece in the correction-plane 75, Figure 9, near the left end of the work-piece. If the switch 82 be turned to the position marked "Light" the diametrically opposite number only will be illuminated designating the light side of the work-piece in the plane 75 near the left end.

To balance the left end of the work-piece in the correction plane 75 weight of the proper amount should be removed from the heavy side of the work-piece as would be indicated on the number-band when the switch 82 is turned to the position marked "Heavy," or weight might be added to the light side of the work-piece in the correction-plane 75 of the proper amount to balance the work-piece in that plane.

In like manner the switch 83 on the right-hand end which controls the electrical circuits for the device 73 (Figure 9) is operated to determine the unbalance existing in the correction-plane 76 (Figure 9) it being understood that when the switch 82 is operated, switch 83 is turned to the "Off" position, and when switch 83 is operated switch 82 is turned to the "Off" position.

There are two switching means used in the operation of the stroboscope light through the pick-up devices:

(1) A manual switching means which cuts the circuit completely off;

(2) The same switching means may be set to a centering position at which the stroboscope light flashes twice at two portions of the cycle of oscillation of the inertia-weights at which position the centering-screw 44 and its centering-lever 30 may be adjusted until two diametrically opposite numbers are flashing alternately on the number-band;

(3) A position whereby the stroboscope light flashes once at one portion only of the cycle of oscillation of the inertia-weights; and (4) A position whereby the stroboscope light flashes once at the other portion of the cycle of oscillation of the inertia-weights 10 and 11.

The automatic switching means used is operated by the oscillation of the inertia-weights 10 and 11 and their associated arm 17. The oscillatory movement of the arm 17 causes the reed 19 to normally alternately contact the contact-plate 32 and the arm 17, each of said contacts with contact-plate 32 and the arm 17 causing the stroboscope light to flash provided said contacts have been switched manually to permit flashing at the time of said contacts. It may be set to flash one of them and not the other—or vice-versa.

The normal sequence of operation of the combined manual and automatic switching means is as follows:

1. The manual switch is set on "Test" or centering position;

2. The centering-screw 44 is manually adjusted until two diametrically opposite numbers are illuminated by the stroboscope light alternately on the number-band. When this occurs the flashing is taking place at the exact center of oscillation of the inertia-weights.

3. The manual switch is set to position "Heavy" or "Light" at the choice of the operator, these designations determining the heavy or light side of the rotating work-piece in a given correction-plane undergoing test. At either of these positions one number only of the two numbers mentioned in section 2, immediately above, will be illuminated once during each cycle of oscillation of the inertia-weights;

4. The calibrated adjusting-means is employed to adjust the normally stationary contact-plate 32 away from its previously adjusted zero or center position until a point is reached in its adjustment where the stroboscope light just stops flashing. This point in adjustment of the contact-plate 32 is just at the end of the amplitude of oscillation of the inertia-weights 10 and 11 about their pivot spring 14, therefore the readings on the calibrated adjustment means are a measure of the amplitude of oscillation of said inertia-weights about their pivot spring. Said amplitude of oscillation of said inertia-weights is proportional to the amplitude of oscillation of the rotating work-piece in said given correction-plane undergoing test. Furthermore, said amplitude of oscillation of said work-piece in said given correction-plane is proportional to the amount of unbalance existing in said correction-plane. Therefore, the amplitude of oscillation of said inertia-weights is proportional to the amount of unbalance in said given correction-plane of the work-piece.

We have now completed the determination of the amount of amplitude of oscillation of the inertia-weights which forms a basis for ascertaining the amount of unbalance weight in the correction-plane of the rotor by comparison with a predetermined unbalance weight in such plane whose amplitude of oscillation had been preliminarily determined by trial and test of a weight of known amount in such plane.

The flashing of the stroboscope light is necessary to secure amplitude of oscillation of the inertia-weights. It may be flashing at both positions of the cycle of oscillation of the inertia-weights as described in 2, above, or in either of the single portion of the oscillation of the weights as outlined in 2, or 3, above, provided the operator first set on the test position of the switch and adjusted the flashing of the stroboscope light by means of the centering-screw 44 and centering-lever 30 until two diametrically opposite numbers flash alternately on the number-band. This assures that the stroboscope light is flashing at the exact center of oscillation of the inertia-weights. We now have determined the amount of unbalance in the given correction-plane undergoing test.

The operation of the novel pick-up device is substantially as follows:

Ordinarily, two or more of the devices are mounted rigidly at convenient points preferably, though not necessarily, on the bearing members 74 of the balance-testing machine in which the work-piece undergoing test is revolving on its axis, the two devices picking up the vibration of such bearing or bearings due to the unbalancing factors in two or more correction-planes in which the unbalancing factors are present, although in some work-pieces which are relatively thin, such as gears, discs, and the like, which are undergoing test, only one inertia-weight, rather than a plurality, is needed. For convenience, in understanding the manner of functioning of the pick-up devices, two have been shown as properly attached to the bearing-members of the work-piece.

The inertia-weights 10 and 11 are chosen and adjusted on their respective threaded members 12 and 13 so that one of each of the devices 72 and 73 may determine the position and amount of unbalance in each of two previously chosen correction-planes 75 and 76 respectively. The inertia-weights 10 and 11 are so chosen and adjusted that the device 72 is responsive to unbalance in the correction-plane 75, but not to unbalance in plane 76, and that the device 73 is responsive to unbalance in correction-plane 76 but not to unbalance in plane 75.

The bearing members 74 of the balance-testing machine are each supported on spherical balls, each of said balls 91 (Figures 10 and 10a), resting in a concave spherical segment on the upwardly extending portion of the frame 69. The bearing members 74 each have two corresponding spherical segments in an inverted relationship to those on the upwardly extending portion of the frame 69. These bearing members 74 being supported on balls, the rolling action is the equivalent of a pendulum suspension.

While the work-piece or rotor 64 is rotated at a speed above the resonant or natural period of the bearing members and of the inertia-weights 10 and 11 about their pivot spring 14 the inertia-weights 10 and 11 are forced to oscillate at the frequency initiated by the rotation of the unbalanced rotor 64.

The ratio-block 51 is set at straight-away position, see Figures 1, 3 and 8, so that the ratio-block 51 rests against the end of stop-screw 61, by turning the knob 57 (Figure 8) clockwise to zero. The ratio-nut 41 is turned counter-clockwise until the ratio-slide 38 (cylinder), Figure 2, rests against stop-pin 40. Then, by adjustment of the centering-screw 44, see Figure 3, the centering-lever 30 may be so positioned as to cause the arm 17 and associated reed 19 to contact the contact-plate 32 just as the inertia-weights 10 and 11 and the associated arm 17 are at the central or neutral position. As the inertia-weights oscillate about the spring pivot 14 in a clockwise direction from central or neutral position the arm 17 leaves contact with the reed 19, proceeds to its maximum and is stopped from further twisting in that direction due to the resisting force in the twisted spring 14 balancing the inertia force in the weights 10 and 11 set up by the initiating oscillation of the entire mass. The oscillation of the mass then starts in the opposite direction, the inertia-force is reduced, and the twisted spring 14 starts to return the weights 10 and 11 and arm 17 toward their zero or neutral position. As this portion of the oscillation cycle continues the inertia-force becomes zero and the inertia-weights 10 and 11 and associated arm 17 return to zero or neutral position at which point the arm 17 contacts the reed 19. At this instant the electrical circuit which flashes the stroboscope light 67 is completed and the light 67 flashes illuminating a number on the number-band 68 temporarily attached circumferentially to the work-piece or rotor 64.

In the manner above described, the next half cycle of the oscillation of the inertia-weights 10 and 11 and associated arm 17 continues, the weights now continuing their counter-clockwise rotation about the pivot spring 14 to a maximum, then returning to neutral or zero position. During this half of the cycle the arm 17 carries the associated reed 19 with it, breaking the contact of the reed 19 with the contact-plate 32. At zero position the reed 19 is again in contact instantaneously with both the upturned end 117 of arm 17 and the contact-plate 32, thus causing the stroboscope light to again flash illuminating a number on the number-band 68. As previously mentioned, the centering-screw is so adjusted that the instantaneous contact takes place at zero or neutral position. This is easily determined by observing the numbers on the number-band 68. This band is numbered in twenty equal divisions and its length is just equal to the circumference of the portion of the rotor 64 on which it is mounted; thus zero and 10 on the mounted number-band 68 are diametrically opposite, as are 1 and 11, 2 and 12, and so on. The centering-screw 44 is adjusted until two such diametrically opposite numbers are illuminated alternately, such as 1 and 11, 4 and 14, and so on, the particular number being determined by the location about the circumference of the unbalance in the particular correction-plane being tested. The electrical circuit is so arranged that either of the alternately flashing numbers may be switched off. Then the number remaining and appearing may indicate the heavy side of the rotor 64 in the correction-plane being tested or the light side. The operator would remove or add weight, according to choice.

A work-piece or rotor 64 should be preliminarily balanced by the operator by trial and error until it is in balance within the desired limits, whereupon an unbalance weight of known amount as great as will be expected to be encountered in commercial balancing operations for a work-piece of this type is applied in the left-hand correction-plane 75.

The inertia-weights 10 and 11 on the right-hand device 73 are adjusted longitudinally on their respectively threaded rods 12 and 13 until no indication of unbalance is apparent as evidenced by the manner in which the stroboscope light 67 flashes.

When the weights 10 and 11 are not oscillating about their pivot spring 14 the light 67 either does not flash at all, or flashes intermittently, not regularly, as when the inertia-weights are oscillating in cyclic sequence. The known weight is then removed from plane 75 and attached in the right-hand correction-plane 76 and the same procedure followed as with the left-hand device 72 on the left bearing member 74. The known unbalance weight in the right-hand correction-plane 76 is not removed.

Then the left-hand device 72 is switched off and the right-hand one 73 is switched on to test position T, Figure 17. The inertia-weights 10 and 11 on the right-hand device are now oscillating in cycles corresponding to the speed of rotation of the rotor 64. The centering-lever 30, having been previously adjusted to the zero center position, a pair of diametrically opposite numbers on the number-band will appear under the uniform semi-cyclic flashing of the light 67. If the oscillation is large the knob 57, Figure 8, may be turned counter-clockwise one full turn when the ratio-block 51 will be in the position as shown in Figures 4, 5 and 6. The ratio-nut 41 is then turned clockwise an amount necessary to just extinguish the flashing light 67, as previously described, while taking careful note of the number of turns, and the fractions of a turn, of the ratio-nut 41. That is the end of travel of the vibration in one direction. If there were seven complete turns and five divisions on the graduated periphery of the ratio-nut 41, there being ten graduations on such nut 41, there are then a total of seventy-five graduations representing the unbalance weight in the right-hand plane 76. Unbalance weights of smaller amount may then be designated as fractional seventy-fifths of the maximum amount. The lock-nut 43, Figure 2, may be loosened and the screw 42 screwed in until it touches the end of the threaded screw 39 and the jam-nut 43 then locked tightly securing the screw 42 in this position.

Another convenient method is to turn the ratio-nut 41 ten full turns and set the lock-screw 42 as above described, and then turn the ratio-knob 57, Figure 8, counter-clockwise until the flashing light 67 just goes out. The maximum unbalance weight is then represented by one hundred divisions of the ratio-nut 41. Smaller weights are then represented as hundreths or decimal parts of the known maximum unbalance weight.

Another method is to use the divisions on the ratio-nut 41 as decimal parts of an ounce or other convenient unit of weight measurement. Assuming that the maximum unbalance weight to be handled were 1.23 ounces—turn the ratio-nut 41 twelve full turns and three divisions, a total of one hundred and twenty-three divisions. Each division then represents .01 ounce. If the rotor 64 were quite heavy so that the maximum amount of unbalance expected were 12.3 ounces and the same procedure were followed each division on the ratio-nut 41 would represent one-tenth of an ounce. In like manner, if the rotor 64 (Figure 9) were of relatively small mass and the mass unbalance expected were .123 ounce, each division on the ratio-nut would then represent .001 ounce.

It is clear that the system as described is subject to many variations in this method. It may be calibrated to indicate almost any weight increment, depth to drill a hole of given size to remove weight, and so on.

As those acquainted with this art will readily understand, the invention is not necessarily limited and restricted to the precise and exact details set forth above and reasonable modifications may be resorted to without departure from the heart and essence of the invention, as defined by the appended claims, and without the loss or sacrifice of any of its material benefits and advantages.

I claim:

1. In a machine of the class described, a vibration pick-up device comprising a frame adapted to be mounted upon a vibratory element of the machine, inertia-weight means carried by said frame and pivotal on an axis disposed substantially at right angles to the plane of the vibrations subject to pick up and with said means adjustable relative to said axis and the direction of said vibrations to effect a vibratory swing of said means about said axis in correlation with and in response to said vibrations, means disposed to bias said inertia-weight means to a normal position relative to said axis and frame and to resist the vibratory swing of said inertia-weight means, and electric switch means carried by said frame and operable by the vibratory movement of said inertia-weight means about said axis to translate said vibrations into recordable electric impulses.

2. In a machine of the class described, a vibration pick-up device comprising a frame adapted to be mounted upon a vibratory element of the machine, inertia-weight means carried by said frame and pivotal upon an axis disposed substantially at right angles to the plane of the vibrations subject to pick up and with said means adjustable relative to said axis and the direction of said vibrations to effect a vibratory swing of said means about said axis in response to selected vibrations in the element supporting said frame, means disposed to restrict the vibratory movement of said inertia-weight means about said axis, and electric switch means carried by said frame and operable by the vibratory movement of said inertia-weight means about said axis to translate said selected vibrations into recordable electric impulses.

3. In a machine of the class described, a vibration pick-up device comprising a frame adapted to be mounted upon a vibratory element of the machine, inertia-weight means carried by said frame and pivotal upon an axis disposed substantially at right angles to the plane of the vibrations subject to pickup and with said means adjustable relative to said axis and the direction of said vibrations to effect a vibratory swing of said means about said axis in response to selected vibrations in the element supporting said frame and electric switch means carried by said frame and operable by the vibratory movement of said inertia-weight means about said axis to translate said selected vibrations into recordable electric impulses.

4. The construction of claim 3 in which said electric switch means comprises an arm connected to said inertia-weight means to receive the vibratory movement thereof, a switch contact on a vibratory portion of said arm, a second switch contact carried by said frame, and means disposed to connect and disconnect said contacts cyclically in response to the vibratory movement of said arm.

5. The construction of claim 3 in which said electric switch means comprises an arm fixed to said inertia-weight means to receive the vibratory movement thereof, a switch contact on a vibratory portion of said arm, a second switch contact carried by said frame, and a switch contact element disposed to make contact with said first and second contacts alternately and to connect the same momentarily between alternations in response to the vibratory movement of said arm.

6. The construction of claim 3 in which said electric switch means comprises a switch contact carried by said inertia-weight means to receive the vibratory movement thereof, and a second switch contact carried by said frame and disposed to be engaged and disengaged by said first named contact cyclically in response to the vibratory movement of said inertia-weight means.

7. The construction of claim 3 in which said electric switch means comprises a switch contact disposed to move in response to the vibratory movement of said inertia-weight means, a second switch contact carried by said frame and disposed to be engaged and disengaged cyclically by said first named contact in response to the vibratory movement of said inertia-weight means, and manual means to adjust the position of said second contact during a balance testing operation.

8. The construction of claim 3 in which said electric switch means comprises a switch contact disposed to move in response to the vibratory movement of said inertia-weight means, a second switch contact carried by said frame and disposed to be engaged and disengaged cyclically by said first named contact in response to the vibratory movement of said inertia-weight means and manual vernier means to adjust the position of said second contact relative to the path of movement of said first contact to determine the amplitude of said vibratory movement.

9. The construction of claim 3 in which said electric switch means comprises a switch contact disposed to move in response to the vibratory movement of said inertia weight means, a second switch contact adjustably carried by said frame, and a third intermediate contact element normally engaged by one of said contacts and disposed to engage said other contact and disengage said normally engaged contact cyclically in response to the vibratory movement of said first contact.

10. The construction of claim 3 in which said electric switch means comprises a switch contact disposed to move in response to the vibratory movement of said inertia weight means, a second switch contact adjustably carried by said frame, a third intermediate contact element normally engaged by one of said contacts and disposed to engage said other contact and disengage said normally engaged contact cyclically in response to the vibratory movement of said first contact, and a manual adjustment for said second contact operable during a vibration testing operation to effect a momentary connecting of said first and second contacts by said third contact substantially midway of the vibratory movement of said first contact whereby an electric impulse is provided twice during each full cycle of the vibratory movement of said first contact and approximately spaced 180° apart in the cycle.

11. The construction of claim 3 in which said electric switch means comprises a switch contact disposed to move in response to the vibratory movement of said inertia weight means, a second switch contact adjustably carried by said frame, a third intermediate contact element normally engaged by one of said contacts and disposed to engage said other contact and disengage said normally engaged contact cyclically in response to the vibratory movement of said first contact, and vernier adjustment means operable manually during a vibration testing operation to adjust the position of said second contact to produce an electric impulse at the extreme end of a vibratory stroke of said first contact whereby the amplitude of vibration may be determined.

12. The construction of claim 3 in which said electric switch means comprises a switch contact disposed to move in response to the vibratory movement of said inertia weight means, a second switch contact adjustably carried by said frame, a third intermediate contact element normally engaged by one of said contacts and disposed to engage said other contact and disengage said normally engaged contact cyclically in response to the vibratory movement of said first contact, a manual adjustment for said second contact operable during a vibration testing operation to effect a momentary connecting of said first and second contacts by said third contact substantially midway of the vibratory movement of said first contact whereby an electric impulse is provided twice during each full cycle of the vibratory movement of said first contact and approximately spaced 180° apart in the cycle and vernier adjustment means operable manually during a vibration testing operation to adjust the position of said second contact to produce an electric impulse at the extreme end of a vibratory stroke of said first contact whereby the amplitude of vibration may be determined.

IRA A. WEAVER.

References Cited in the file of this patent

UNITED STATES PATENTS

| Number | Name | Date |
|---|---|---|
| 1,704,341 | Rathbone | Mar. 5, 1929 |
| 2,302,670 | Buchanan | Nov. 24, 1942 |
| 2,328,114 | Weaver et al. | Aug. 31, 1943 |
| 2,344,349 | Forster | Mar. 14, 1944 |
| 2,486,896 | Weaver et al. | Nov. 1, 1949 |
| 2,487,035 | Weaver et al. | Nov. 1, 1949 |